(12) United States Patent
Häusler et al.

(10) Patent No.: US 10,171,551 B2
(45) Date of Patent: Jan. 1, 2019

(54) SYSTEMS AND METHODS FOR INTEGRATING EXTERNAL RESOURCES FROM THIRD-PARTY SERVICES

(71) Applicant: UberGrape GmbH, Vienna (AU)

(72) Inventors: Felix Häusler, Vienna (AU); Leo Fasbender, Vienna (AU); Stefan Kröner, Vienna (AU); Dietmar Schabus, Vienna (AU)

(73) Assignee: UberGrape GmbH, Vienna (AT)

( * ) Notice: Subject to any disclaimer, the term of this patent is extended or adjusted under 35 U.S.C. 154(b) by 0 days.

(21) Appl. No.: 16/013,735

(22) Filed: Jun. 20, 2018

(65) Prior Publication Data

US 2018/0302459 A1 Oct. 18, 2018

Related U.S. Application Data

(62) Division of application No. 15/135,360, filed on Apr. 21, 2016.

(Continued)

(51) Int. Cl.
*H04L 29/08* (2006.01)
*G06F 17/30* (2006.01)
*G06F 17/27* (2006.01)

(52) U.S. Cl.
CPC .......... *H04L 67/02* (2013.01); *G06F 17/2765* (2013.01); *G06F 17/30554* (2013.01); *G06F 17/30864* (2013.01)

(58) Field of Classification Search
CPC ............... H04L 67/02; G06F 17/30554; G06F 17/30864
See application file for complete search history.

(56) References Cited

U.S. PATENT DOCUMENTS

| | | |
|---|---|---|
| 7,545,816 B1 | 6/2009 | Coutts et al. |
| 2003/0182427 A1 | 9/2003 | Halpern |
| 2003/0191823 A1 | 10/2003 | Bansal et al. |
| 2006/0074734 A1 | 4/2006 | Shukla et al. |
| 2007/0021995 A1 | 1/2007 | Toklu et al. |

(Continued)

OTHER PUBLICATIONS

Caleffi, The 'hashtag': a new word or a new rule?, pp. 46-69 (Year: 2015).*

(Continued)

*Primary Examiner* — Arvin Eskandarnia
(74) *Attorney, Agent, or Firm* — Perkins Coie LLP

(57) ABSTRACT

Various embodiments concern communication platforms that can integrate electronic resources distributed amongst various sources by tagging metadata associated with each of the electronic resources, thereby making the electronic resources readily searchable from a messaging interface using a single search architecture. The messaging interface can be used by users to communicate with one another. In some embodiments, the communication platform performs a search based on characters as they are entered into the text field of the messaging interface. This search across various heterogeneous sources enables the communication platform to identify a reference to an electronic resource the sender of a message wishes to insert within the message. Recipients of the message may be able to access the electronic resource directly from the messaging interface. The communication platform can also perform natural language processing techniques such as speech act detection on messages and/or other textual resources to facilitate intelligent communication streamlining.

19 Claims, 14 Drawing Sheets

Related U.S. Application Data

(60) Provisional application No. 62/150,788, filed on Apr. 21, 2015.

(56) References Cited

U.S. PATENT DOCUMENTS

| | | | |
|---|---|---|---|
| 2008/0301299 A1* | 12/2008 | Cahill | H04L 67/306 709/226 |
| 2010/0275109 A1 | 10/2010 | Morrill | |
| 2011/0218925 A1 | 9/2011 | Addala et al. | |
| 2011/0270834 A1* | 11/2011 | Sokolan | G06F 17/27 707/737 |
| 2012/0239669 A1 | 9/2012 | Miller et al. | |
| 2012/0322432 A1 | 12/2012 | Biernat et al. | |
| 2013/0046826 A1 | 2/2013 | Stanton | |
| 2014/0040741 A1 | 2/2014 | Van Os et al. | |
| 2014/0046921 A1* | 2/2014 | Bau | G06F 17/30864 707/706 |
| 2016/0315995 A1 | 10/2016 | Häusler et al. | |
| 2017/0364599 A1 | 12/2017 | Ohanyerenwa et al. | |

OTHER PUBLICATIONS

Extended European Search Report for European Patent Application No. 16783872.1; dated Feb. 13, 2018; 19 pages.

Restriction Requirement dated May 30, 2018 of U.S. Appl. No. 15/135,360 by Häusler, F., et al., filed Apr. 21, 2016.

PCT Search Report and Written Opinion, dated Aug. 4, 2016; PCT Application No. PCT/US2016/028688—7 pages.

O'Hear, Steve, "ChatGrape Is an Intelligent Messaging App That Could Save Your Team a Heck of a Lot of Time", Retrieved on the Internet: <URL: https://techcrunch.com/2014/12/08/chatgrape>; [Retrieved on Jul. 12, 2016];, Dec. 8, 2014, p. 1-4.

U.S. Appl. No. 15/135,360 by Häusler, F., et al., filed Apr. 21, 2016.

Notice of Allowance dated Aug. 24, 2018 of U.S. Appl. No. 15/135,360 by Hausler, F., et al., filed Apr. 21, 2016.

Notice of Allowance dated Aug. 29, 2018 for U.S. Appl. No. 16/013,761 of Hausler, F. et al. filed Jun. 20, 2018.

U.S. Appl. No. 16/013,761 of Hausler, F. et al. filed Jun. 20, 2018.

\* cited by examiner

800

802
Identify electronic resources hosted by various sources

804
Integrate the electronic resources by tagging metadata

806
Catalog and index the metadata to make it searchable

808
Receive an input from a user

810
Detect a reference to a particular electronic resource

812
Allow the user to insert a link to the particular electronic resource into the input

902
Receive input from user

904
Identify trigger character(s) present in the input

906
Identify one or more possible target electronic resources

908
Allow the user to select one or more of the possible target electronic resources 910
Insert a link, visual representation, etc., for the selected electronic resource(s) into the input

1002
Receive input from user

1004
Identify trigger character(s) present in the input

1006
Identify workflow trigger(s)

1008
Streamline communication by intelligently automating tasks and workflows

FIG. 10

SYSTEMS AND METHODS FOR INTEGRATING EXTERNAL RESOURCES FROM THIRD-PARTY SERVICES

CROSS-REFERENCE TO RELATED APPLICATIONS

This application is a divisional application of U.S. patent application Ser. No. 15/135,360 filed on Apr. 21, 2016 and titled "SYSTEMS AND METHODS FOR INTEGRATING EXTERNAL RESOURCES FROM THIRD-PARTY SERVICES," which claims the benefit of U.S. Provisional Patent Application Ser. No. 62/150,788 filed on Apr. 21, 2015 and titled "SYSTEMS AND METHODS FOR INTEGRATING RESOURCES FROM EXTERNAL WEBSITES AND SERVICES," which is incorporated by reference herein in its entirety.

Various embodiments concern communication platforms that utilize third-party services, and, more specifically, systems and methods for indexing the electronic resources hosted by various third-party services to make the electronic resources readily searchable by a user.

BACKGROUND

As modern companies grow, more and more of their information is stored in network-accessible storages. For example, many companies use one or more cloud storage services that are accessible via a web browser and/or an application that utilizes an application programming interface (API) to communicate with the cloud storage service(s). Consequently, employees often store some data objects locally (e.g., on the user device used to access the cloud storage or an external storage medium), while other data objects are stored remotely (e.g., using a cloud storage service).

But employees rarely remember where, exactly, a particular data object is stored. Traditional lookup systems require the employee either complete a search query, which is often limited in scope or effectiveness, or scour multiple tabs, file folders, applications, etc., each time a data object is needed. However, the time lost searching for files (also referred to as the "lookup factor") could be used much more effectively. This problem is compounded for any employee that prepares or reviews many data objects throughout the work day. In fact, the "lookup factor" typically accounts for over 33% of an employee's time.

BRIEF DESCRIPTION OF THE DRAWINGS

These and other objects, features, and characteristics will become more apparent to those skilled in the art from a study of the following Detailed Description in conjunction with the appended claims and drawings, all of which form a part of this specification. While the accompanying drawings include illustrations of various embodiments, the drawings are not intended to limit the claimed subject matter.

FIG. 8 is a flow diagram of a process for integrating dissimilar electronic resources from different external sources.

FIG. 9 is a flow diagram of a process for performing Natural Language Processing (NLP) and identifying target electronic resources as may occur in some embodiments.

FIG. 10 is a flow diagram of a process for intelligently streamlining communication.

Figure 1:
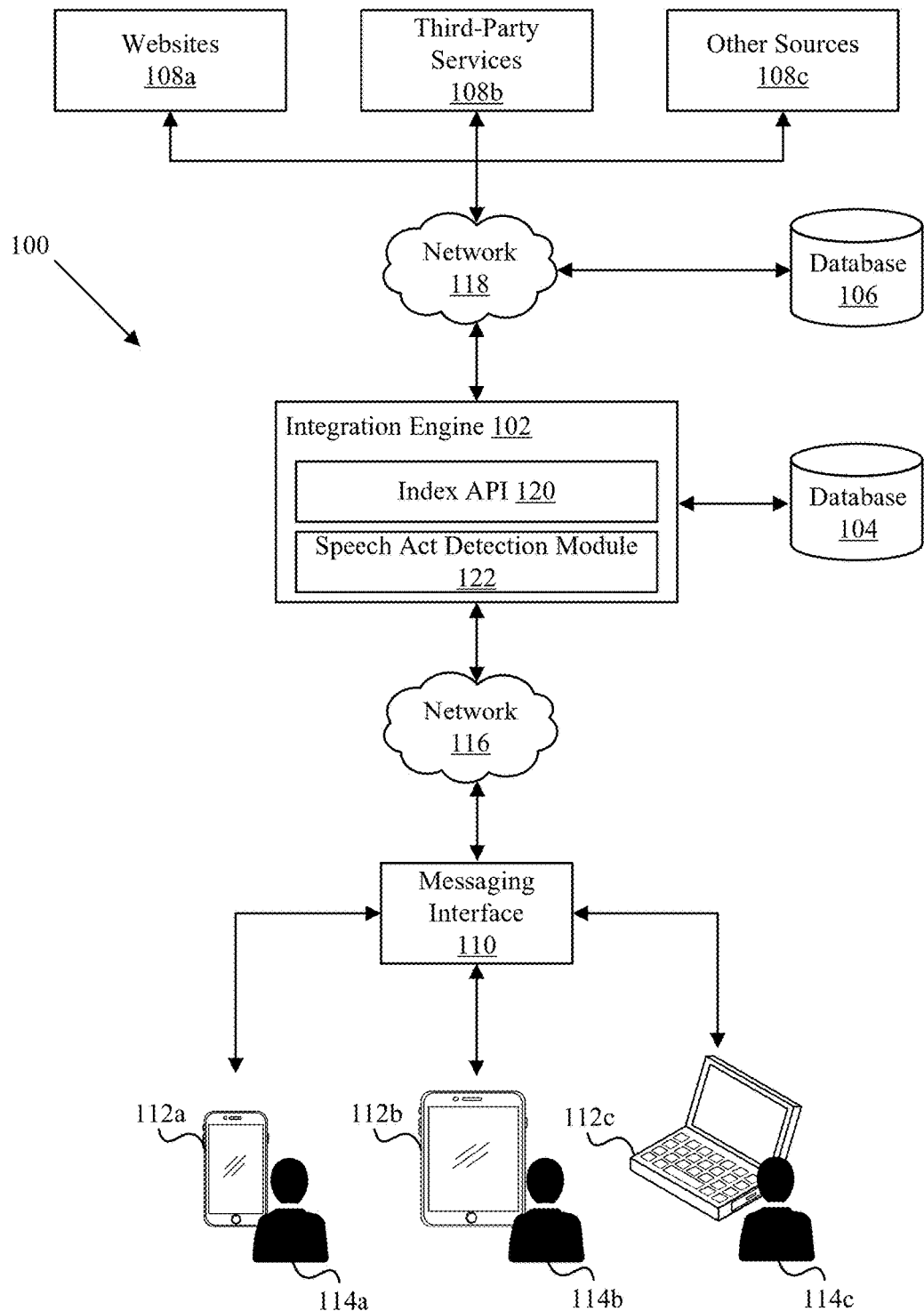
FIG. 1 is a generalized block diagram depicting certain components of a communication platform as may occur in some embodiments.

The figures depict various embodiments described throughout the Detailed Description for purposes of illustration only. While specific embodiments have been shown by way of example in the drawings and are described in detail below, the technology described herein is amenable to various modifications and alternative forms. The intention is not to limit the technology to the particular embodiments described. Accordingly, the claimed subject matter is intended to cover all modifications, equivalents, and alternatives falling within the scope of the technology as defined by the appended claims.

DETAILED DESCRIPTION

Communication and collaboration platforms are described herein that employ deep service integration, which enables third-party services to be more intimately and intuitively integrated than traditional communication tools. Deep service integration can enable a communication platform to initiate a bi-directional communication channel between itself and a third-party service, unlike traditional chat-based communication tools that are normally limited to pulling information from a third-party service. Examples of third-party services include GitHub, BitBucket, Google Drive, Google Calendar, Trello, DropBox, and Jira. One skilled in the art will recognize that these example services are intended to be illustrative only and that other services could be integrated as well.

More specifically, a communication platform can homogenize dissimilar electronic resources and make those dissimilar electronic resources readily searchable using a single search architecture. Homogenization of electronic resources distributed amongst multiple third-party services and other sources eliminates the need for a specialized tool for each third-party service. The term "source" is intended to include third-party services such as those listed above, as well as proprietary services, websites (e.g., YouTube, Giphy), local storage (e.g., native hard drive or external storage), and social media networks (e.g., Twitter, Facebook). The term "electronic resources," meanwhile, can refer to messages, documents, digital media (e.g., images and video), calendar events, tasks, support tickets, code repository updates, etc. The electronic resources can be (and often are) maintained across multiple sources, which makes it difficult to effectively and efficiently manage the electronic resources. For example, a user might store some files locally on a native hard drive, while other files are stored on Google Drive or DropBox.

A user can interact with the communication platform (and, thus, the homogenized electronic resources) via a messaging interface. The messaging interface is preferably accessible through some combination of a web browser, a software program, a mobile application, and an over-the-top (OTT) application. The messaging interface allows the user to search all connected sources (e.g., integrated third-party services, websites, local storage) directly from the messaging interface. Therefore, the communication platform can enable the user to access other environments or "spheres" without leaving the messaging interface by integrating different sources. Consequently, the time needed to look up and reference (e.g., provide a link to) a specific electronic resource can be significantly reduced.

For convenience and purposes of illustration, various embodiments are described with reference to messaging systems for enterprises (e.g., companies) and employees. However, one skilled in the art will recognize that the embodiments are equally applicable to other communication systems with educational, personal, social networking, etc., applications.

Moreover, the techniques introduced herein can be embodied as special-purpose hardware (e.g., circuitry), as programmable circuitry appropriately programmed with software and/or firmware, or as a combination of special-purpose hardware and programmable circuitry. Hence, embodiments may include a machine-readable medium having stored thereon instructions that may be used to program a computer (or some other electronic device) to perform a process. The machine-readable medium may include, but is not limited to, floppy diskettes, optical disks, compact disk read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Terminology

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there between, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components. Modules are typically functional components that can generate useful data or other output using specified input(s). A module may or may not be self-contained. An application program (also called an "application") may include one or more modules, or a module can include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that an element or feature can be described in more than one way.

Consequently, alternative language and synonyms may be used for any one or more of the terms discussed herein, and special significance is not to be placed on whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term Likewise, the disclosure is not limited to the various embodiments given in this specification.

System Topology Overview

FIG. 1 is a generalized block diagram depicting certain components of a communication platform 100 as may occur in some embodiments. The communication platform 100 allows users 114a-c (e.g., employees of an enterprise) to communicate with one another using a messaging interface 110. The messaging interface 110 is preferably accessible to user devices 112a-c associated with the users 114a-c through some combination of a web browser, a software program, a mobile application, and an OTT application. The user devices 112a-c may be, for example, a mobile phone, personal digital assistant (PDA), tablet, personal computer (e.g., laptop computer or desktop computer), music player (e.g., an Apple iPod Touch), wearable electronic device (e.g., a watch), etc.

Although the users 114a-c typically communicate with one another by typing messages, some embodiments contemplate other types of user input (e.g., gestures and audible responses). For example, the communication platform 100 may be configured to generate textual representations of audible responses by performing speech recognition. As another example, the communication platform 100 may be configured to identify a user's intended response by optically recognizing a gesture observed by one of the user devices 112a-c. Consequently, each of the user devices 112a-c could be configured to receive a textual input (e.g., via a keyboard), an audio input (e.g., via a microphone), a visual input (e.g., via a camera or web cam), or some combination thereof.

The messaging interface 110 may be generated by an integration engine 102, which communicatively couples different instances of the messaging interface 110 presented by the user devices 112a-c. The integration engine 102 can be communicatively coupled to the user devices 112a-c across a network 116 (e.g., the Internet, a local area network, a wide area network, a point-to-point dial-up connection). The integration engine 102 can include various components, modules, etc., that enable the communication platform 100 to perform deep service integration, which makes electronic resources distributed amongst multiple sources (e.g., third-party services, websites, local storage) readily searchable. The electronic resources can include documents, support tickets, calendar events, notifications/comments, tasks, etc.

More specifically, the integration engine 102 may be configured to execute APIs that are associated with particular websites 108a or third-party services 108b (also referred to as "tools"). The integration engine could also be configured to be facilitate real-time data exchange with other sources 108c, such as news feeds and social media platforms. The websites 108a, third party services 108, and other source 108c can be collectively referred to as "sources" of electronic resources. The communication platform 100 and the integration engine 102 can both be implemented using special-purpose hardware (e.g., circuitry), programmable circuitry appropriately programmed with software and/or firmware, or as a combination of special-purpose hardware and programmable circuitry.

Once a source has been integrated, that source can be prompted to push new content and/or indications of user activity to the communication platform 100. The communication platform 100 can then notify the appropriate user(s) (e.g., by posting a notification to the messaging interface 110) and process the indication to make the activity (and the corresponding electronic resource) accessible to, and searchable by, the appropriate user(s).

In some embodiments, the integration engine 102 identifies, tags, and stores metadata for each electronic resource that has been identified and/or retrieved by the communication platform 100. The metadata can be stored in a local database 104 or a remote database 106 that is accessible over a network 118. Network 116 and network 118 may be the same network or distinct networks. An Index API 120 can ensure the metadata for the electronic resources from disparate sources has a uniform structure even through the electronic resources may be dissimilar. The uniform metadata structure allows all of the electronic resources to be readily searched by the integration engine 102.

A speech act detection module 122 can utilize Natural Language Processing (NLP) principles to detect references to particular electronic resources within a message. The speech act detection module 122 could also be configured to recognize dates, questions, assignments, and/or to-dos included in the message and trigger workflows automatically. For example, the speech act detection module 122 may be configured to automatically create an event upon recognizing a date and/or time within a message. Similarly, the speech act detection module 122 may be able to automatically add an assignment, task, or timestamp (e.g., to Wunderlist or another application) in response to recognizing the necessary information.

The communication platform 100 typically does not employ conventional Internet Relay Chat (IRC) protocols. Instead, the communication platform 100 is generally structured around a websocket infrastructure that permits bidirectional communication between the messaging interface 110 (e.g., a web browser, application, or communication/chat client), the integration engine 102, and/or the different sources 108a-c of electronic resources. More specifically, the communication platform 100 may be built on top of a software stack model (e.g., Windows, Apache, MySQL, and PHP or "WAMP") that is structured using websockets on top of Transmission Control Protocol (TCP). The websocket infrastructure also permits constant full-duplex connections (i.e., devices/components can communicate with one another in both directions) to be created that can be updated in real-time. The communication platform 100 (and, more specifically, its communication protocol) could also be spoken to via Hypertext Transfer Protocol (HTTP) on top of TCP (e.g., HTTP long-polling).

Figure 2:
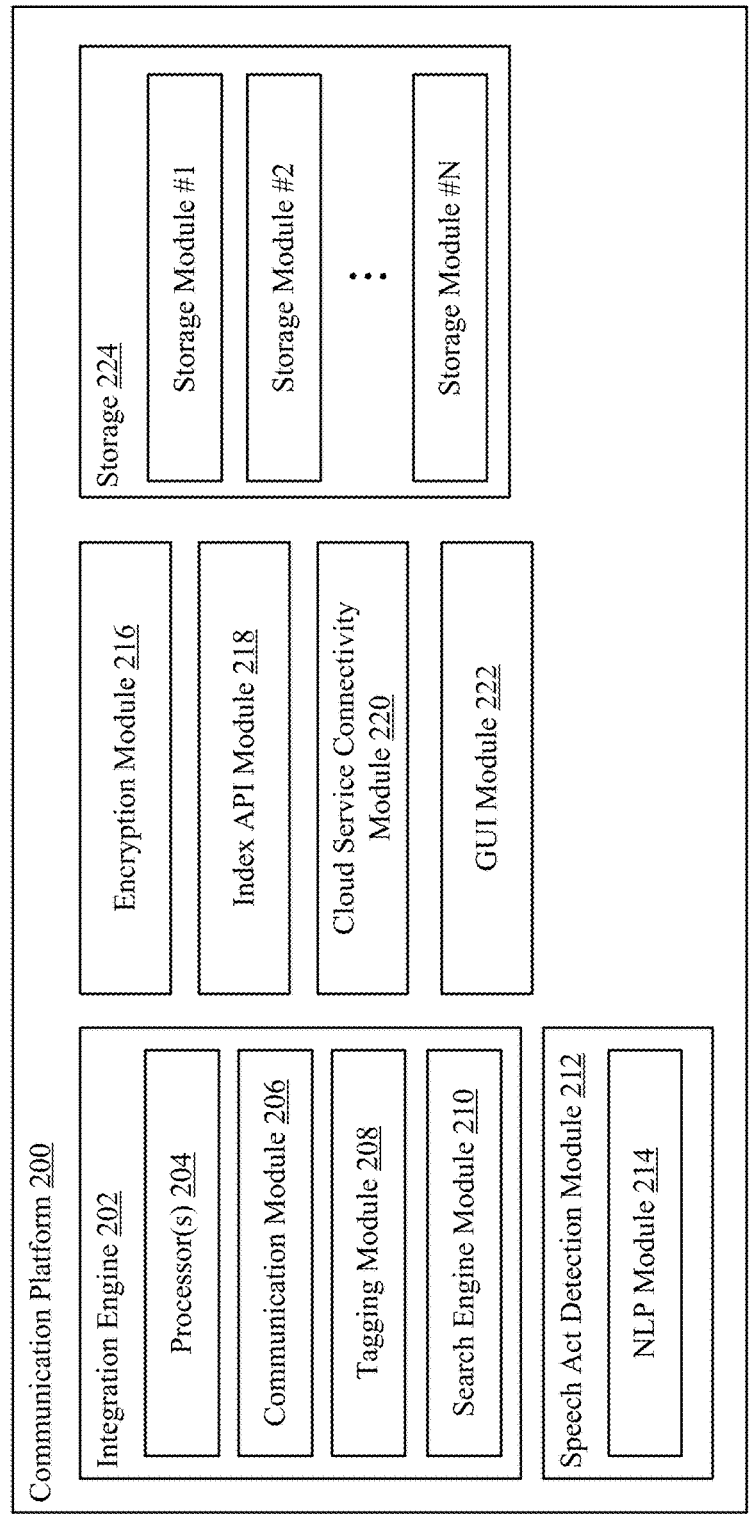
FIG. 2 is a block diagram depicting exemplary components of a communication platform that is able to integrate electronic resources from various sources.

FIG. 2 is a block diagram depicting exemplary components of a communication platform 200 that is able to integrate electronic resources from various sources. According to the embodiment shown in FIG. 2, the communication platform 200 can include an integration engine 202, one or more processors 204, a communication module 206, a tagging module 208, a search engine module 210, a speech act detection module 212, a Natural Language Processing (NLP) module 214 an encryption module 216, an Index API module 218, a cloud service connectivity module 220, a GUI module 222, and a storage 224 that may include multiple storage modules. Other embodiments of the communication platform 200 may include some, all, or none of these modules and components, as well as other modules or components not shown here. Further yet, some embodiments may incorporate two or more of these modules into a single module and/or associate a portion of the functionality of one or more of these modules with a different module.

The integration engine 202 can retrieve and index electronic resources (e.g., documents, support tickets, calendar events, development issues) distributed amongst different external sources and hosted locally within the storage 224. For example, the communication platform 200 may be configured to integrate third-party services such as GitHub, BitBucket, Google Drive, Trello, DropBox, Jira, etc. The communication platform 200 may also be configured to integrate e-mail and calendar services such as Google Calendar, Gmail, and Microsoft Outlook. In some embodiments, the communication platform 200 is "smartly" integrated with the external sources. That is, the communication platform 200 can be configured to automatically update metadata or a database record whenever a newly-created electronic resource is added or an existing electronic resource is modified on one of the external sources.

A communication module 206 can manage communications between components of the communication platform 200 and between the communication platform 200 and other systems (e.g., user devices 112a-c of FIG. 1). For example, the communication module 206 may be responsible for retrieving/receiving an electronic resource from a third-party service, retrieving/receiving metadata associated with the electronic resource, transmitting a link to the electronic resource to a user device, etc. The electronic resource and the metadata could be stored in a storage 224, one or more particular storage modules, a database communicatively coupled to the communication platform 200, or some combination thereof.

The integration engine 202 (and more specifically the tagging module 208) can also be configured to perform pre-processing and/or post-processing of the electronic resources. Pre-processing may include tagging the electronic resources and corresponding metadata prior to a user searching for a particular electronic resource via a messaging interface. Tags or labels could be attributed to the electronic resources based on the source, author(s), keyword(s) in the title or content, etc. Post-processing, meanwhile, may include tagging electronic resources after the user has interacted with the messaging interface. For example, tags or labels can be attributed to archived copies of e-mails and/or messages sent by the user based on the content of the subject line or body, embedded links to electronic resources, other users who have been mentioned, etc. The post-processing tags can be used to improve subsequent searches, to group messages by topic, to formulate progress reports for specific projects, etc.

A search engine module 210 can analyze available electronic resources and allow a user to easily identify an electronic resource. For example, the user (who may be part of a group or "team" of users) could prompt the search engine module 210 to begin searching for the appropriate electronic resource by entering a "trigger character." Thus, a "trigger character" could be used to identify what the user would like the search engine module 210 to look for.

The speech act detection module 212 can detect and trigger workflows automatically using an NLP module 214, thereby increasing the efficiency of workplace communication. More specifically, the NLP module 214 can employ one or more detection/classification processes to identify dates, questions, assignments, to-dos etc., in a message created by a user. The speech act detection module 212 could then automatically perform an action (e.g., create a calendar event, poll, or task) based on the identified information. The identified information, as well as any metadata tags appended to the message by the tagging module 208, can be stored within storage 224 to assist when performing detection/classification in the future. In some embodiments, the NLP module 214 is able to perform detection/classification on messages entered by users and/or other textual resources such as archived e-mails, remotely stored documents, etc.

An encryption module 216 can ensure the security of communications (e.g., instant messages). The encryption module 216 may heavily secure the network connection to the communication platform 200 using secure sockets layer (SSL) or transport layer security (TLS) encryption, a unique SSL certificate, and/or some other cryptographic protocol. As described above, the Index API module 218 can promote deep service integration by being easily customizable for specific workplace needs, connectivity for particular external sources (e.g., third-party services), etc. In some embodiments, a backup module is responsible for performing automatic backups of some or all of the metadata and/or messages.

A cloud service connectivity module 220 can be configured to correctly predict words being typed by the user (i.e., provide "autocomplete" functionality) and/or facilitate connectivity to cloud-based sources. The autocomplete algorithm(s) employed by the cloud service connectivity module 220 may learn the habits of a particular user, such as which electronic resource(s) are often referenced when communicating with others. In some embodiments, the cloud service connectivity module 220 allows messages, metadata, etc., to be securely transmitted between the communication platform 200, a user device, and a cloud storage (e.g., database 106 of FIG. 1). The cloud service connectivity module(s) 220 may employ particular security protocols or communication protocols depending on whether the host cloud is public, private, or a hybrid.

A graphical user interface (GUI) module 222 can generate a messaging interface that can be used by users to communicate with one another. The messaging interface is preferably accessible through at least one of a web browser, a software program, a mobile application, and an OTT application. The messaging interface also allows users to perform a single search for electronic resources that may be maintained across different storage mediums and third-party services. Storage 224 can be any device or mechanism used for storing information. For example, storage 224 may be used to store instructions for running one or more applications or modules (e.g., speech act detection module 212, Index API module 218) on processor(s) 204.

Figure 3:
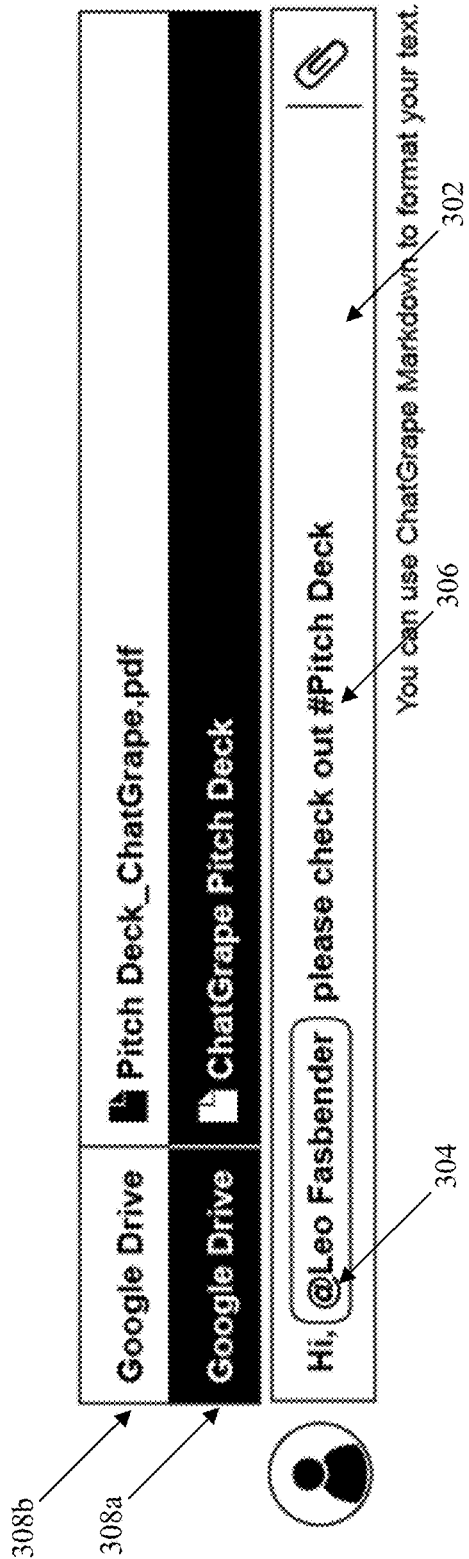
FIG. 3 depicts a text field in which a user can enter a message and a link to an electronic resource.

FIG. 3 depicts a text field 302 in which a user can enter a message and one or more links to an electronic resource. Typically, users communicate with one another by typing characters to compose a message within the text field 302. Numerous functionalities are possible using the communication platform described herein.

For example, a user can enter an identity character 304 to tag one or more other users. More specifically, the communication platform could display a list of users upon recognizing the identity character 304. The list of users may be filtered and continually updated in real-time as the user enters additional characters. The user may also be able to enter a trigger character 306 that prompts the communication platform to begin processing the content of the message in the text field 302. The identity character 304 and the trigger character 306 are typically non-alphanumeric characters. For example, FIG. 3 depicts the identity character 304 and the trigger character 306 as an at-sign (@) and pound sign or "hashtag" (#), respectively.

As described above, the characters that follow the trigger character 306 can be processed and used to search different sources (e.g., local storage and integrated third-party services) for potential target electronic resources 308a-b. In some embodiments, the communication platform searches the indexed electronic resources and the metadata while the user is typing (i.e., in real-time). The target electronic resources 308a-b may be presented to the user, who is able to select a desired electronic resource and insert a link to that resource within the text field 302. Right-clicking or hovering above one of the target electronic resources 308a-b may allow the user to preview metadata associated with that electronic resource.

When one of the target electronic resources 308a-b is selected, it may be visually highlighted in some way. Here, for example, a user has selected electronic resource 308a and its color has been changed to visually distinguish it from the other electronic resources. Once an electronic resource has been selected, the communication platform may intelligently replace one or more characters in the message that were previously entered by the user. For example, the communication platform may insert a link to the selected electronic resource into the message and remove the trigger character 306 and any ensuing uninterrupted characters (i.e., consecutive characters without spaces). The communication platform could also intelligently determine which character(s) should be removed based on natural language processing of the message. Here, for example, the communication platform may remove "#Pitch Deck" from the message and replace that language with a link to the file entitled "ChatGrape Pitch Deck" that is hosted on Google Drive.

Figure 4A:
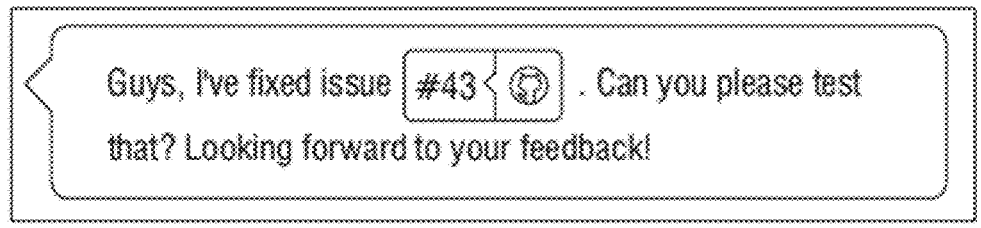
FIGS. 4A-C depict sample messages that may be exchanged using the messaging interface.
Figure 4B:
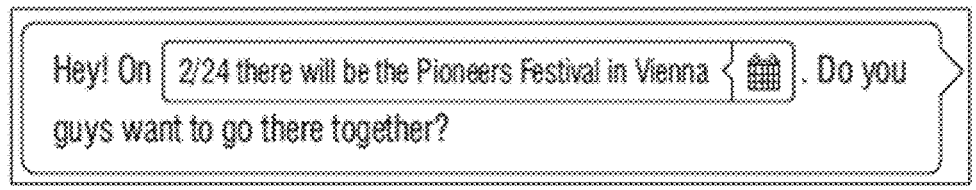
Figure 4C:
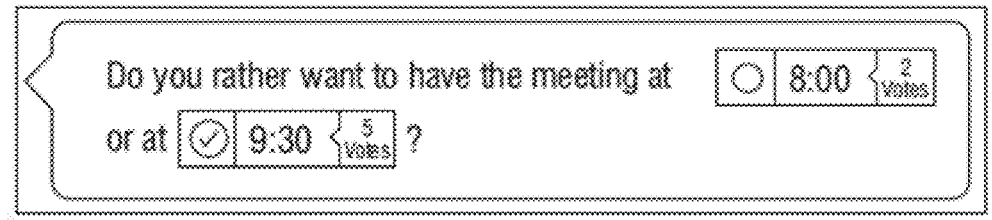

FIGS. 4A-C depict sample messages that may be exchanged using the messaging interface. The communication platform can reduce the time needed to look up and reference (e.g., provide a link to) an electronic resource by deeply integrating electronic resources distributed amongst various sources (e.g., local storage and third-party services). The communication platform may utilize Natural Language Processing to automatically detect and trigger workflows.

For example, FIG. 4A depicts a message that includes a link to an electronic resource (here, a source code repository and a service tag). Users who receive the message can access the linked electronic resource, although the electronic resource remain on the external service. For example, the linked electronic resource of FIG. 4A may be integrated from GitHub and, upon selecting the link, a user may be redirected to a GitHub environment (e.g., a website or an application).

Some embodiments of the communication platform are also able to integrate calendar services, such as Google Calendar. References to events or deadlines within the message could be automatically replaced by calendar invites, tasks, or reminders that can be easily accepted by other users. For example, the message of FIG. 4B includes a calendar invite for "Pioneers Festival in Vienna." Once a user selects the calendar invite, an event may be added to Google Calendar or Microsoft Outlook Calendar. The event could also be automatically added to the user's calendar in response to determining the user has answered affirmatively (e.g., by typing "yes"). Similarly, a task and timestamp could be added to Wunderlist, Evernote, DropTask, Task Manager, etc., when an assignment or a to-do is recognized by the communication platform within the message.

The communication platform can also be configured to identify inquiries within the text field that have a limited number of possible responses. FIG. 4C, for example, depicts a message in which a user has asked whether a meeting should be held at 8:00 or 9:30. After recognizing the inquiry, the communication platform can automatically insert selectable answers (e.g., as radio buttons or check boxes) that allow the user responsible for generating the inquiry to see a summary of the results rather than a list of individual responses. Polling decisions could be identified by parsing the message for specific language (e.g., the terms "whether" or "or") that triggers a particular detection scheme.

Figure 5:
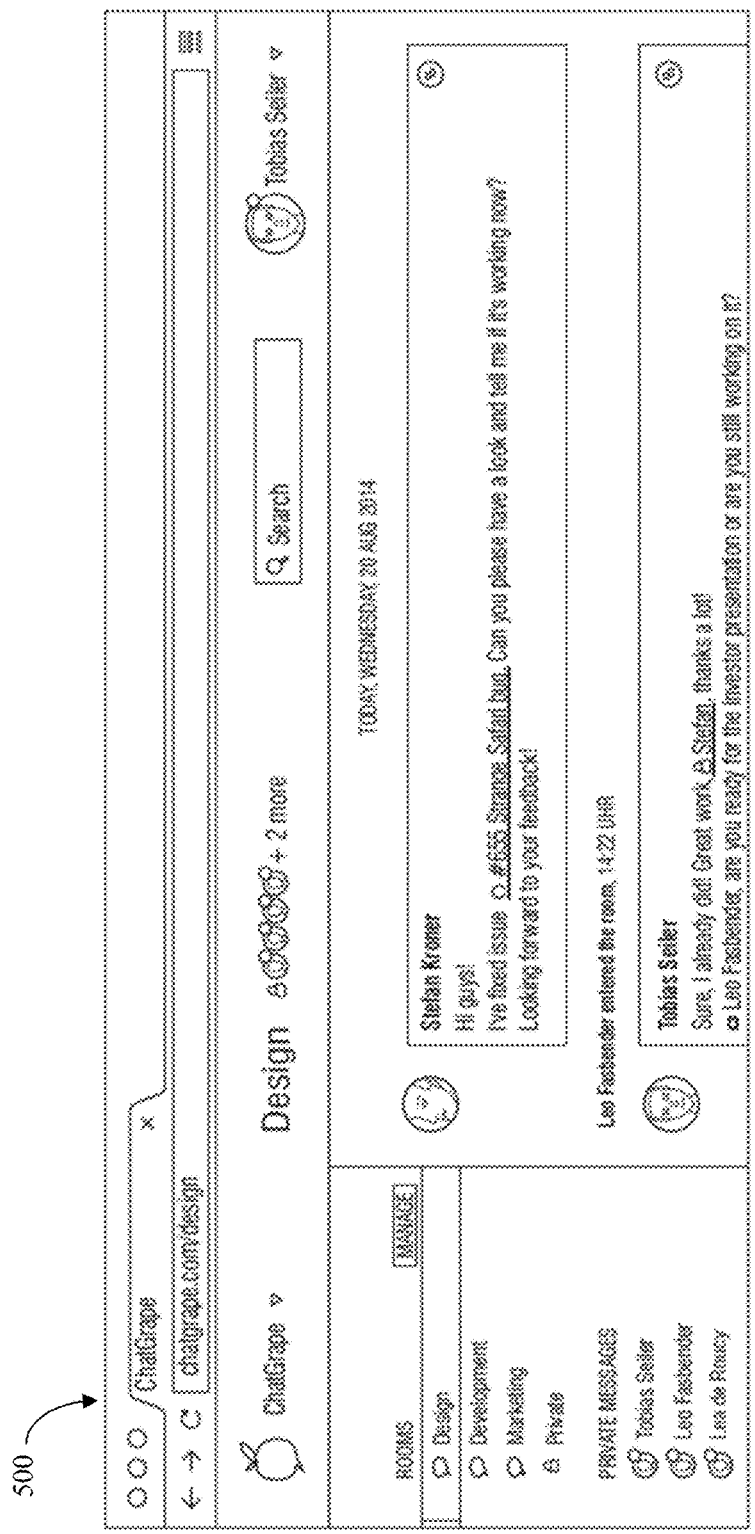
FIG. 5 is a screenshot of a messaging interface that is generated by a communication platform and enables users to communicate with one another.

FIG. 5 is a screenshot of a messaging interface 500 that is generated by a communication platform and enables users to communicate with one another. The messaging interface 500 can be intuitively designed and arranged based on the tags/labels, metadata, etc., associated with the electronic resources accessible to the communication platform and the messages transmitted between the users. For example, the messaging interface 500 could include persistent chat rooms that are organized by topic or team and a direct messaging window. Unlike traditional communication tools, the messaging interface 500 is highly intelligent and enables a user to search for integrated electronic resources without leaving the messaging interface 500. While the messaging interface 500 of FIG. 5 is illustrated as being accessed via a web browser, the messaging interface 500 could also be accessed via a mobile application (e.g., configured for Apple iOS or Android) or a software program (e.g., configured for Apple OS X, Microsoft Windows, or Linux).

The messaging interface 500 utilizes an Index API that enables the databases of various external sources to be linked, crawled, and/or indexed by the communication platform. The Index API enables electronic resources maintained by the external sources to be searched and accessed using the messaging interface 500. The highly integrated infrastructure allows the communication platform to identify what electronic resource(s) are being sought using search algorithms and/or NLP, and then take an appropriate action. For example, the communication platform may automatically insert a link to an electronic resource in response to determining the user has begun entering the name of the electronic resource in the chat field.

In some embodiments, developers are able to integrate their own sources into the communication platform using the Index API, webhooks, etc. External company databases could also be linked to the communication platform to provide additional functionality. For example, an enterprise may wish to upload employee profiles or customer records to the communication platform so that employee and customer information is readily accessible to users of the messaging interface 500. Specific knowledge bases may also be created and integrated into the communication platform for particular target sectors and lines of industry. For example, statutes, codes, and legal databases can be integrated with a communication platform designed for a law firm, while diagnostic information, patient profiles, and medical databases may be integrated with a communication platform designed for a hospital.

Figure 6:
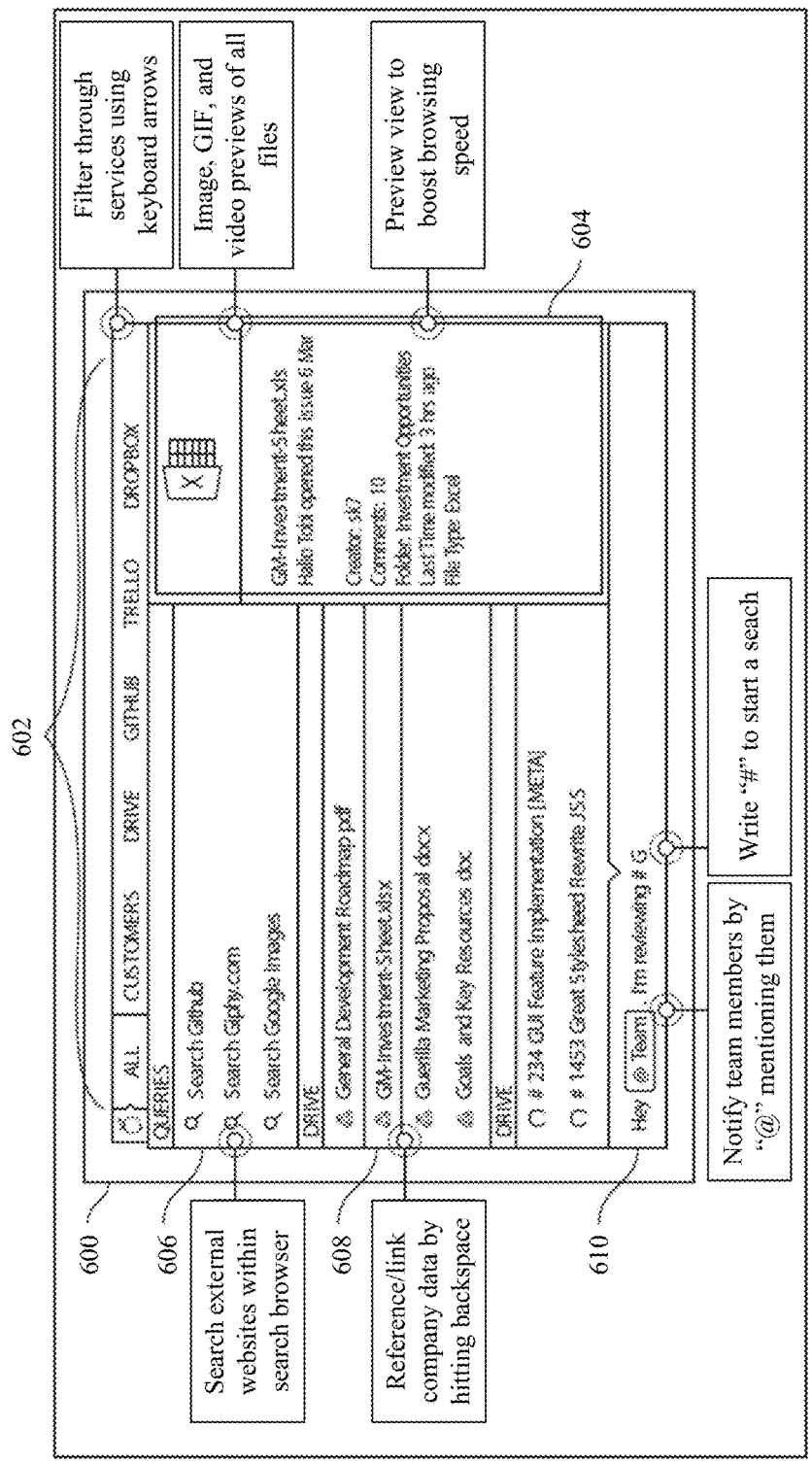
FIG. 6 depicts a search browser that can be used to quickly look up and reference (e.g., provide a link to) electronic resources hosted by integrated third-party services.

FIG. 6 depicts a search browser 600 that can be used to quickly look up and reference (e.g., provide a link to) electronic resources hosted by integrated third-party services. More specifically, the search browser 600 may be displayed when a user indicates a desire to reference an electronic resource (e.g., by typing a trigger character into messaging interface 500 of FIG. 5).

The search browser 600 can include a navigation bar 602, a preview pane 604, an external query pane 606, a selection indicator 608, and a text field 610. The navigation bar 602 allows users to quickly switch between various databases, local storage, and integrated third-party services. Here, for example, a user could readily switch between an internal customer database, Google Drive, Github, Trello, and Dropbox. The navigation bar 602 could be configured for a particular type of user device. For example, the navigation bar 602 may require the user swipe to the left or right when viewing the search browser 600 on a mobile phone or a tablet. As another example, the user could interact with the navigation bar 602 by clicking or by using the arrow keys when viewing the search browser 600 on a personal computer.

The preview pane 604 allows the user to review metadata for a currently-selected electronic resource. Generally, the format and structure of the preview pane 604 remains consistent regardless of the source (e.g., local storage, website, or third-party service) and file type (e.g., GIF, JPEG, XLS). This is possible in embodiments where the Index API of the communication platform ensures that the metadata for some or all of the electronic resources is similarly structured. A user may also be able to preview an electronic resource and/or metadata associated with the electronic resource by selecting the resource (e.g., by holding a finger down on a touch-sensitive mobile phone). The external query pane 606 links or connects to external services. Thus, the external query pane 606 allows a user to perform a search of a particular source from within the search browser 600.

In some embodiments, the search browser 600 is configured to depict a selection indication 608 that identifies which of the electronic resource(s) displayed by the search browser 600 are currently selected. For example, in FIG. 6 the electronic resource labeled "GM-Investment-Sheet.xlsx" has been selected by a user and metadata associated with that electronic resource is viewable in the preview pane 604. A text field 610 allows users to transmit messages and communicate with one another. A user may also be able to review past messages or view a message filtering 600 by scrolling up within the text field 610. The structure of the search browser 600 makes it easy to communicate with one or more team members, search indexed electronic resources, and transmit an electronic resource to the team member(s) for review.

Figure 7A:
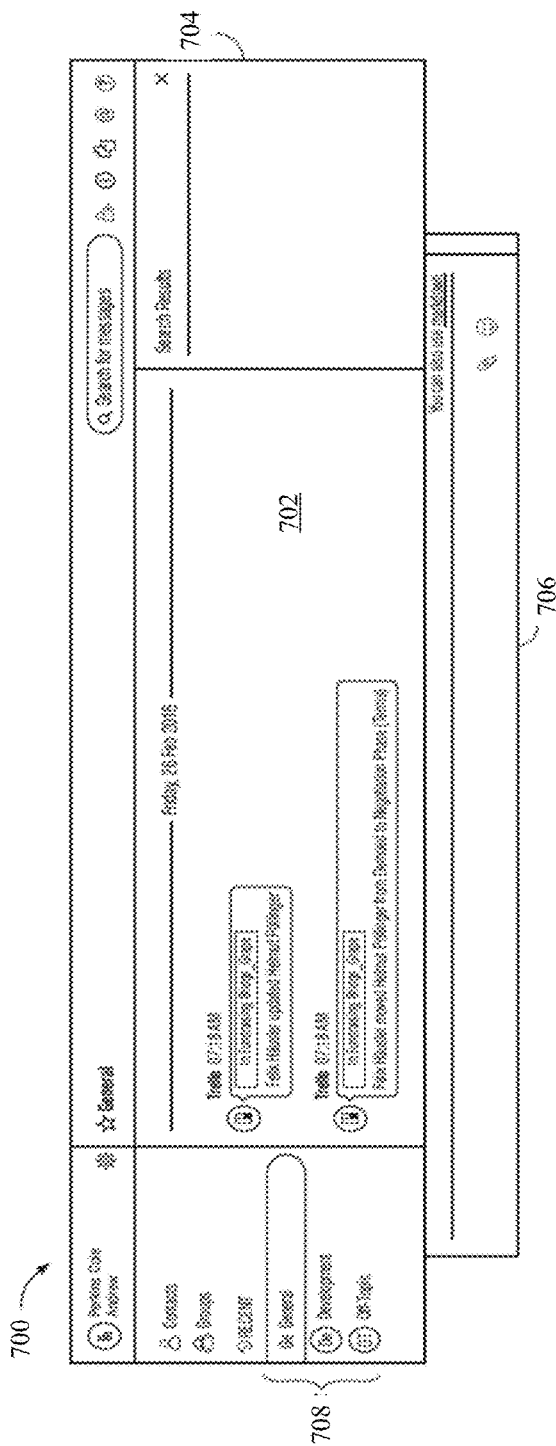
FIGS. 7A-D depict a series of interfaces that enable a user to communicate with others and search for electronic resources.

FIGS. 7A-D depict a series of interfaces that enable a user to communicate with others and search for electronic resources. More specifically, FIG. 7A depicts a messaging interface 700 that includes a conversation panel 702, a search results panel 704, and a text field 706. The conversation panel 702 can display previous messages and updates to relevant electronic resources, while the search results panel 704 can display the results of searches recently completed by the user. Oftentimes, the messaging interface 700 will include multiple communication threads that are each accessible to distinct groups of users. Here, for example, the messaging interface 700 includes three different threads 708. Each thread 708 can have certain access permissions for different users.

Figure 7B:
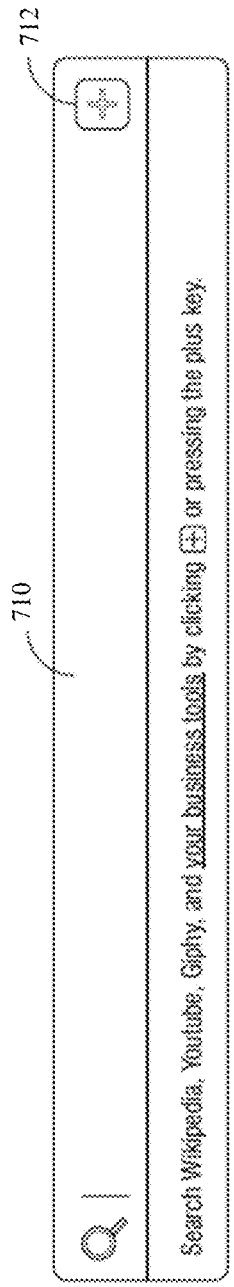

In order to post a message or a link to an electronic resource in one of the communication threads 708, the user can begin typing in the text field 706. As shown in FIG. 7B, a search interface 710 may be displayed upon determining the user has entered a trigger character or upon recognizing the user has begun referencing a specific electronic resource or source. The search interface 710 allows the user to add a link to an electronic resource to the text field 706 without needing to know which source is actually responsible for hosting the electronic resource.

Figure 7C:
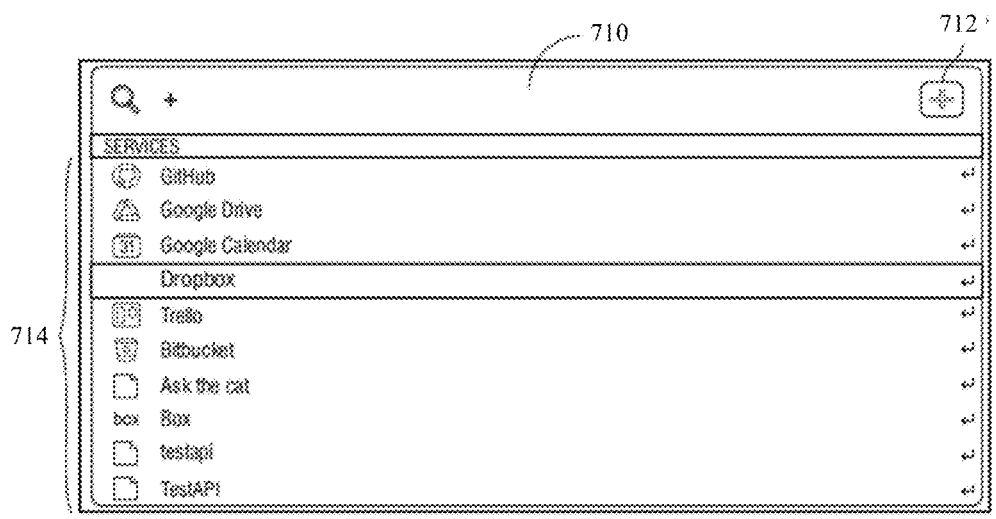

In some embodiments, the search interface 710 may include a filter button 712 that allows the user to specify which source(s) (e.g., local storage, websites, and third-party services) should be included in the search. For example, the user might specify that only files stored on Google Drive or Dropbox should be searched. As shown in FIG. 7C, a filter menu 714 may appear when the user selects the filter button 712. The filter menu 714 can include a list of the source(s) that can be included in or excluded from the search.

Figure 7D:
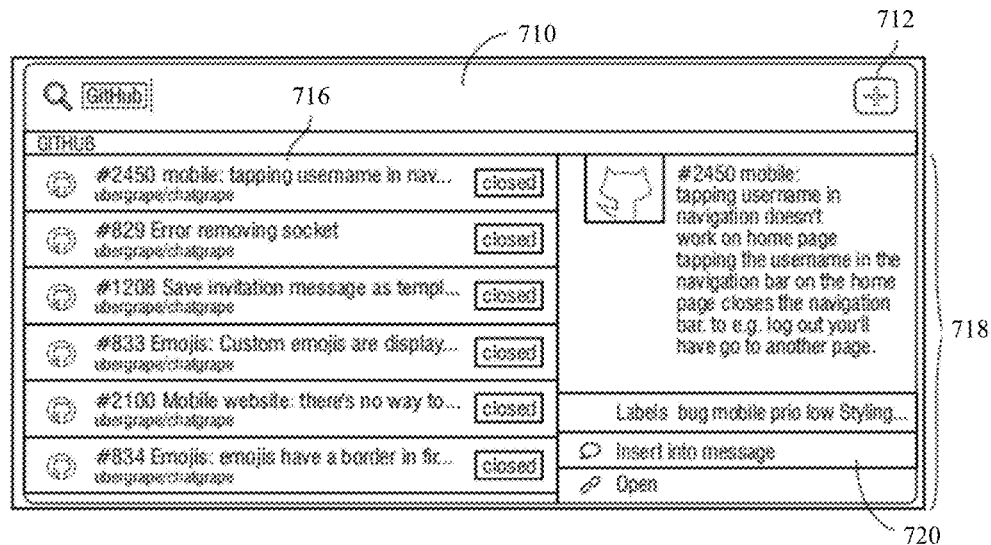

A list of results can be displayed when the user begins typing into the search interface 710 as shown in FIG. 7D. In some embodiments, the list of results is updated in real-time as the user continues to add or remove characters. When the user selects a desired electronic resource 716, metadata associated with the desired electronic resource 716 may be displayed in a preview pane 718. The metadata could include, for example, the source, labels that have been associated with the electronic resource, the date and/or time of the most recent edit, the creator of the electronic resource, permissions, etc.

The preview pane 718 could also include a selectable button 720 that allows the user to conduct various actions on the object, such as marking a task as finished or inserting a link to the desired electronic resource 716 (or the desired electronic resource 716 itself) directly into the text field 706. The link could also be added to the text field 706 in response to receiving some other indication (e.g., upon determining the user double clicked the desired electronic resource 716).

In some embodiments, the communication platform responsible for generating the messaging interface calculates and assigns a probability to each file within the list of results. The probability represents the likelihood that a given file is the desired file. One skilled in the art will recognize that the probability can be based on various factors, such as the degree of similarity between a file name and the character(s) entered into the search interface 710, the frequency with which the user accesses certain files, etc. Moreover, the list of results could be arranged based on these probabilities. For example, the file having the highest probability (and thus having the highest likelihood of being the desired file) may be located closest to the search interface 710.

FIG. 8 is a flow diagram of a process 800 for integrating dissimilar electronic resources from different external sources. At block 802, the communication platform can identify electronic resources (e.g., files, documents, calendar events) hosted by one or more sources. The source(s) can include websites, third-party services, and local storage. At block, 804, the communication platform can integrate the electronic resources by tagging metadata, and, at block 806, the communication platform can catalog and index the metadata to make it searchable. An Index API can ensure the metadata structure is uniform, which allows dissimilar resources to be readily searched by the communication platform using a single search architecture.

At block 808, the communication platform receives an input (e.g., a textual message) from a user. The input may be one of a series of inputs that form a conversation thread between two or more users. At block 810, the communication platform can detect a reference to a particular electronic resource, and then perform a search across heterogeneous electronic resources using a probabilistic ranking.

Oftentimes, the reference will be embedded within a larger message that requires the communication platform to intelligently determine which characters or words are intended to be part of the reference. See, for example, the message within text field 302 of FIG. 3. The communication platform generally detects the reference by first identifying a trigger character within the input that prefixes one or more alphanumeric characters, and then performing a search of the heterogeneous electronic resources based on the alphanumeric character(s) that follow the trigger character. Said another way, the communication platform may parse the alphanumeric character(s) to detect a reference to an electronic resource. At block 812, the communication platform can allow the user to insert a link to the particular electronic resource or the particular electronic resource itself into the input. For example, the communication platform may allow the user to insert a link to a Microsoft Word document directly into a message that is addressed other members of a development team.

FIG. 9 is a flow diagram of a process 900 for performing NLP and identifying target electronic resources as may occur in some embodiments. At block 902, the communication platform can receive an input (e.g., a textual message) from a user. The communication platform can then determine whether any trigger characters are present within the input as shown at block 904. Trigger characters (e.g., "#," "*," "!") can be used to initiate a search for an electronic resource. More specifically, the trigger character can be used to specify a query for a search across heterogeneous electronic resources maintained across multiple external sources. For example, the communication platform may identify any uninterrupted characters (i.e., consecutive characters without spaces) that follow the trigger character, and use those uninterrupted characters to search the heterogeneous electronic resources. As another example, the communication platform may analyze characters near a particular syntax that is known to often accompany names for electronic resources (e.g., file extensions such as .doc or .exe).

At block 906, the communication platform can identify one or more possible target electronic resources based on the analyzed character(s) within the input. In some embodiments, the communication platform is able to identify possible target electronic resources in real-time (i.e., as the user is typing). The communication platform may also be configured to "autocomplete" what is being typed by the user using a known library of electronic resources. At block 910, the communication platform can allow the user to select one or more of the possible target electronic resources. The communication platform can then insert a link to the selected electronic resource, a visual representation (e.g., icon) of the selected electronic resource, or the selected electronic resource itself into the input, as shown at step 912.

FIG. 10 is a flow diagram of a process 1000 for intelligently streamlining communication. Blocks 1002 and 1004 are largely similar to blocks 902 and 904 of FIG. 9. However, the communication platform need not necessarily identify trigger character(s) in the input when performing speech act detection. In such embodiments, the communication platform may automatically parse the input and analyze its contents without requiring a trigger character. Consequently, NLP can be used to enrich communication between multiple users without requiring further user input.

At block 1006, the communication platform can identify workflow triggers within the input. Workflow triggers can include, for example, calendar events, assignments, or polling decisions. Such triggers often form bottlenecks in active communication between users by interrupting workflow. More specifically, the communication platform could parse the input for a particular syntax (e.g., question or imperative clause) that triggers some action in the communication platform.

At block 1008, the communication platform can streamline communication by intelligently automating at least some of the tasks and workflows identified within the input. For example, the communication platform may recognize a polling decision and insert radio buttons, check boxes, etc., for each possible outcome. Recipients of the message can then select an outcome, rather than type in a response. This allows the sender to see a summary for all recipients instead of individual responses.

Unless contrary to physical possibility, it is envisioned that the steps described above may be performed in various sequences and combinations. For example, the communication platform may perform NLP on the input automatically without requiring the user enter a trigger character. Additional steps could also be included in some embodiments.

Figure 11:
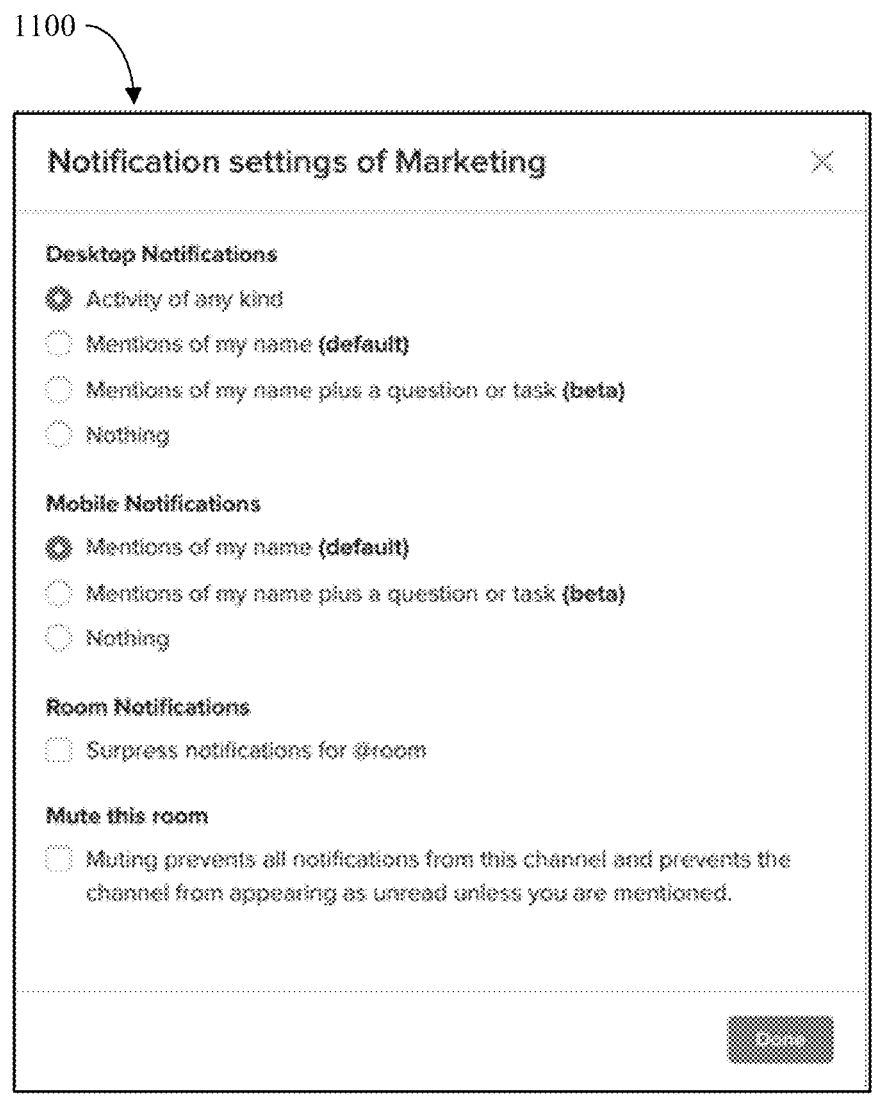
FIG. 11 depicts an interface that allows a user to assign an importance level to various types of messages.

FIG. 11 depicts an interface that allows a user to assign an importance level to various types of messages. The importance level, which is based at least in part on the content of the messages as detected by the communication platform, can be assigned by the user in a notification settings menu 1100. For example, the importance level of a message may be based on whether the message is addressed directly to the user or includes a mention of the user. As another example, the importance level could be based on whether the message includes a question or a task that needs to be answered or acknowledged.

The importance level assigned to a message can affect which notifications are delivered to the user or whether notifications are delivered at all. As shown in FIG. 11, in some embodiments the user is able to specify which notifications should be created and transmitted based on the delivery platform (e.g., a web browser, software program, mobile application, OTT application, and/or email).

Users of the communication platform may also be able to search for context-based results via a messaging interface (e.g., messaging interface 700 of FIG. 7A). Context-based searching is enabled by the communication platform performing pre-processing and/or post-processing of messages sent via the messaging interface. More specifically, the communication platform may be able to readily search and retrieve certain messages based on metadata associated with those messages. For example, a user may request all messages that were sent by a particular user in the last week that included a task. Upon receiving the query, the communication platform can identify messages that satisfy some or all of the search criteria (e.g., messages that (1) have the particular user listed as the sender, (2) have the user listed as a recipient, (3) were transmitted in the last week, and/or (4) include a task). The communication platform may prioritize or rank the messages that include at least some of the search criteria, and then present the prioritized list of messages to the user for review.

Figure 12:
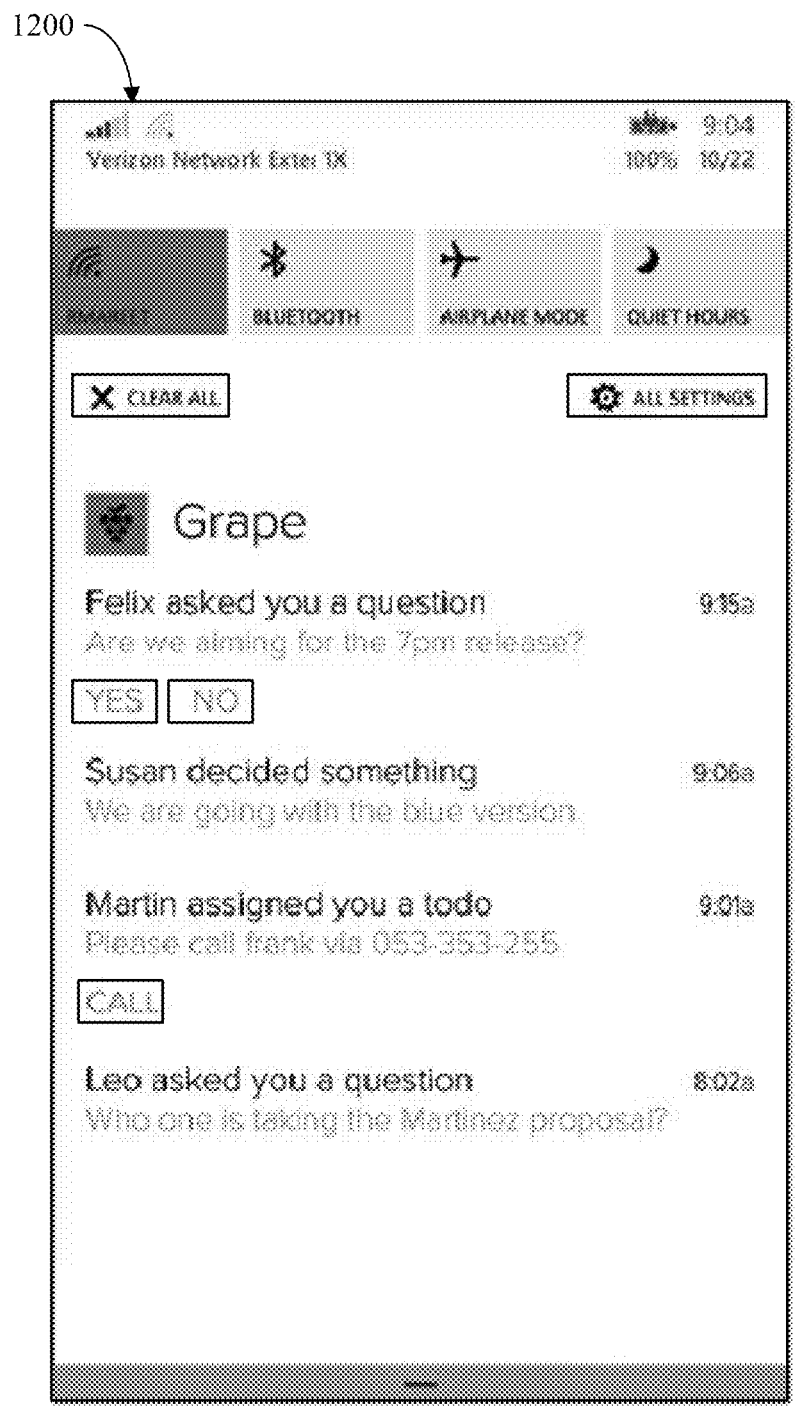
FIG. 12 illustrates how certain messages (e.g., those including yes/no questions) can be answered directly from a push notification list.

FIG. 12 illustrates how certain messages (e.g., those including binary questions or imperative clauses) can be answered or acknowledged directly from a push notification list. The push notification list is viewable on an interface 1200 of a user device (e.g., a mobile phone, tablet, or personal computer). The interface 1200 could be presented via a web browser, software program, mobile application, or OTT application. Here, for example, a push notification list is presents on a mobile phone.

The manner in which a message is parsed by the communication platform allows certain information to be extracted from the message. For example, the communication platform may determine a binary question is asked within the message, and then create separate buttons for each possible response that allow the user to readily answer the binary question while viewing the push notification list. As another example, the communication platform may determine another user has asked the user to call, and then extract a recognized telephone number from the message or retrieve a telephone number associated with the other user from a database (e.g., an employee information database).

The buttons, which allow recipient(s) of the message to easily respond, can also be created directly from the messaging interface that is used to create the message. For example, the creator of a message could specify that one or more buttons should be presented with a message when it is viewed by one or more recipients.

Computer System

Figure 13:
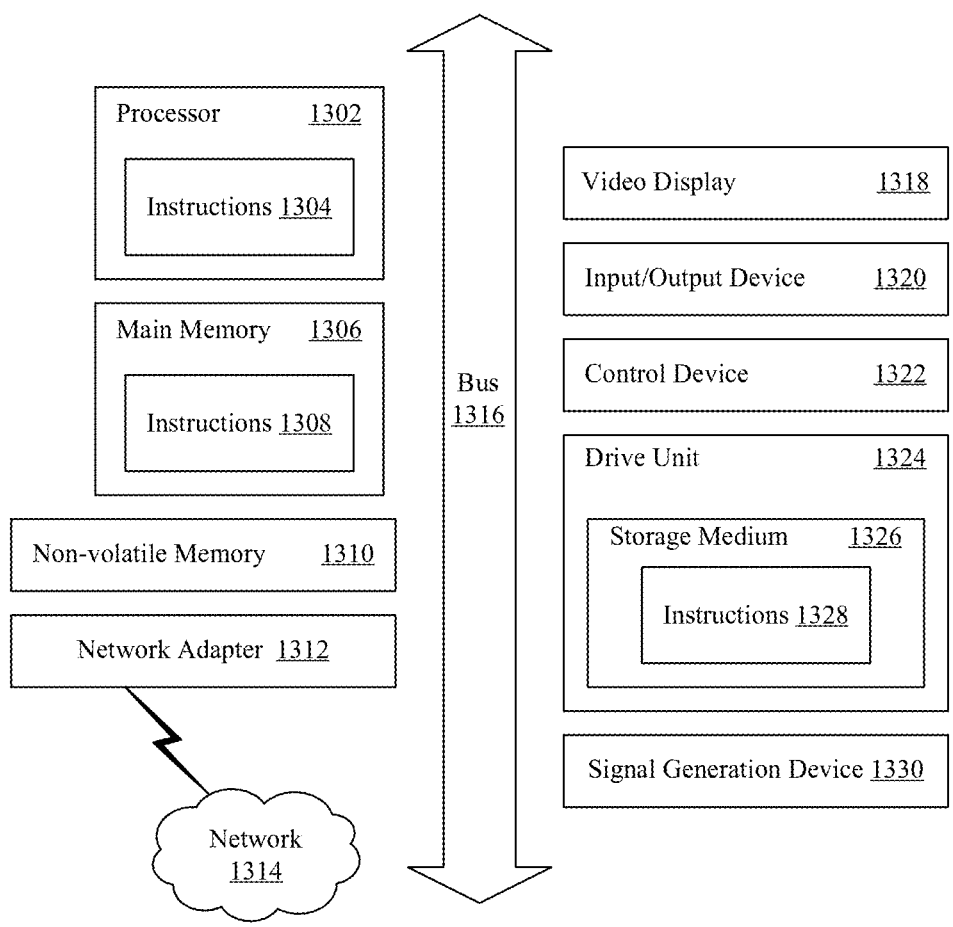
FIG. 13 is a block diagram illustrating an example of a computer system in which at least some operations described herein can be implemented.

FIG. 13 is a block diagram illustrating an example of a computing system 1300 in which at least some operations described herein can be implemented. The computing system may include one or more central processing units ("processors") 1302, main memory 1306, non-volatile memory 1310, network adapter 1312 (e.g., network interfaces), video display 1318, input/output devices 1320, control device 1322 (e.g., keyboard and pointing devices), drive unit 1324 including a storage medium 1326, and signal generation device 1330 that are communicatively connected to a bus 1316. The bus 1316 is illustrated as an abstraction that represents any one or more separate physical buses, point to point connections, or both connected by appropriate bridges, adapters, or controllers. The bus 1316, therefore, can include, for example, a system bus, a Peripheral Component Interconnect (PCI) bus or PCI-Express bus, a Hyper-Transport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

In various embodiments, the computing system 1300 operates as a standalone device, although the computing system 1300 may be connected (e.g., wired or wirelessly) to other machines. In a networked deployment, the computing system 1300 may operate in the capacity of a server or a client machine in a client-server network environment, or as a peer machine in a peer-to-peer (or distributed) network environment.

The computing system 1300 may be a server computer, a client computer, a personal computer (PC), a tablet PC (e.g., an iPad), a laptop computer, a personal digital assistant (PDA), a mobile phone (e.g., an iPhone), a processor, a web appliance, a network router, switch or bridge, a console, a hand-held console, a gaming device, a music player, a wearable device (e.g., a watch), or any other device capable of executing a set of instructions (sequential or otherwise) that specify actions to be taken by the computing system 1300.

While the main memory 1306, non-volatile memory 1310, and storage medium 1326 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 1328. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module or sequence of instructions referred to as "computer programs." The computer programs typically comprise one or more instructions (e.g., instructions 1304, 1308, 1328) set at various times in various memory and storage devices in a computer, and that, when read and executed by one or more processing units or processors 1302, cause the computing system 1300 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices 1310, floppy and other removable disks, hard disk drives, optical disks (e.g., Compact Disk Read-Only Memory (CD-ROMS), Digital Versatile Disks, (DVDs)), and transmission type media such as digital and analog communication links.

The network adapter 1312 enables the computing system 1300 to mediate data in a network 1314 with an entity that is external to the computing device 1300, through any known and/or convenient communications protocol supported by the computing system 1300 and the external entity. The network adapter 1312 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network adapter 1312 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can include, but are not limited to, intrusion-prevention, intrusion detection, next-generation firewall, personal firewall, etc.

As indicated above, the techniques introduced here implemented by, for example, programmable circuitry (e.g., one or more microprocessors), programmed with software and/ or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Remarks

The foregoing description of various embodiments has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

Although the Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

What is claimed is:

1. A computer-implemented method comprising:
   identifying a service that is to be integrated into a communication platform, wherein the service hosts electronic resources within one or more databases;
   integrating the electronic resources by tagging metadata associated with each electronic resource;
   indexing the metadata to make the electronic resources readily searchable from a messaging interface that is generated by the communication platform;
   analyzing a textual input entered by a user at the messaging interface;
   detecting a reference to a desired electronic resource within the textual input;
   identifying one or more suggested electronic resources based on the reference; and
   allowing the user to select the desired electronic resource from the one or more suggested electronic resources.

2. The computer-implemented method of claim 1, further comprising:
   inserting a link to the desired electronic resource within the textual input.

3. The computer-implemented method of claim 1, wherein the reference within the textual input is detected in real time, and wherein the one or more suggested electronic resources are identified in real time.

4. The computer-implemented method of claim 1, wherein the electronic resources include digital files, calendar invitations, previous textual inputs, or some combination thereof.

5. The computer-implemented method of claim 4, wherein the electronic resources are tagged using a uniform metadata structure that allows dissimilar content to be searched using a single search query.

6. The computer-implemented method of claim 4, wherein the previous textual inputs are written by a plurality of users that includes the user.

7. The computer-implemented method of claim 6, wherein the communication platform is used for private team-based messaging and the plurality of users are team members.

8. The computer-implemented method of claim 2, wherein the textual message, including the link to the desired electronic resource, is to be transmitted to another user.

9. The computer-implemented method of claim 1, wherein analyzing the textual input entered by the user further comprises:
   identifying recognizable elements within the textual input using natural language processing techniques.

10. The computer-implemented method of claim 1, further comprising replacing the reference with a link to the desired electronic resource.

11. The computer-implemented method of claim 1, wherein the reference includes a trigger character that establishes a beginning of the reference and at least one other character.

12. The computer-implemented method of claim 11, wherein the at least one other character is used to identify the at least one suggested electronic resource.

13. The computer-implemented method of claim 1, further comprising:
   assigning a probability to each of the one or more electronic resources, wherein the probability represents the likelihood a corresponding electronic resource is the desired electronic resource; and
   presenting the one or more electronic resources on the interface in order of probability.

14. The computer-implemented method of claim 13, wherein the probabilities are recalculated and, if necessary, the one or more electronic resources presented on the interface are rearranged each time the user adds a new character or removes an existing character from the textual input.

15. The computer-implemented method of claim 1, further comprising prompting an integrated electronic resource to push new content to the user.

16. The computer-implemented method of claim 6, further comprising prompting an integrated electronic resource to push indications of the plurality of users' activity to the user.

17. The computer-implemented method of claim 1, wherein the service comprises external sources and local sources.

18. The computer-implemented method of claim 1, further comprising:
   identifying a workflow trigger within the textual communication; and
   automating a workflow based on the identified trigger.

19. The computer-implemented method of claim 18, wherein the workflow trigger is a polling decision and the automating a workflow includes inserting radio buttons for each possible outcome into the textual communication.

* * * * *